Dec. 25, 1951   H. RINIA ET AL   2,579,702
TRACTION HOT-GAS ENGINE WITH SPEED AND POWER CONTROL
Filed Sept. 13, 1945
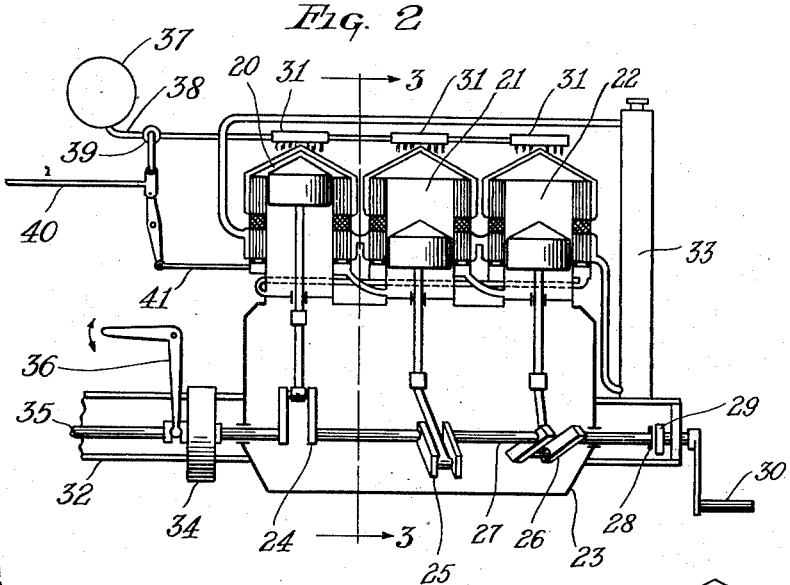
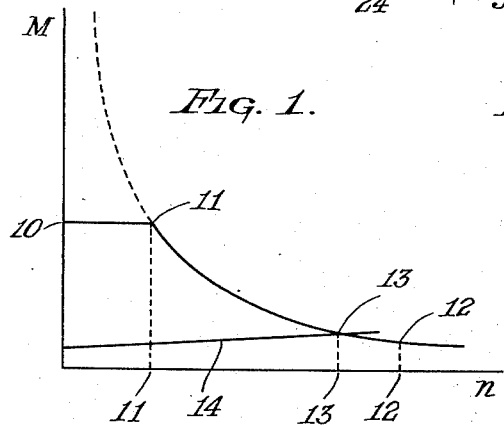
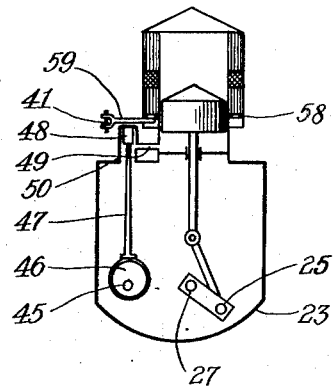
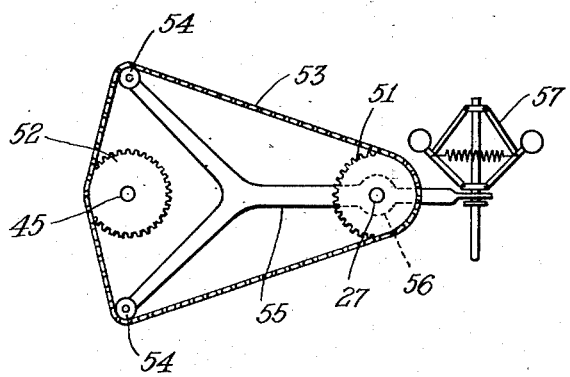
HERRE RINIA
HEINRICH DE BREY
FRANCISCUS LAMBERTUS van WEENEN
INVENTORS.
BY E. L. Wanderoth
ATTORNEY Patented Dec. 25, 1951

2,579,702

UNITED STATES PATENT OFFICE 2,579,702

TRACTION HOT-GAS ENGINE WITH SPEED AND POWER CONTROL

Herre Rinia, Heinrich de Brey, and Franciscus Lambertus van Weenen, Eindhoven, Netherlands, assignors to Hartford National Bank & Trust Co., Hartford, Conn., as trustee Application September 13, 1945, Serial No. 616,092
In the Netherlands August 11, 1944

Section 1, Public Law 690, August 8, 1946
Patent expires August 11, 1964

5 Claims. (Cl. 60—24)

This invention relates to a hot-gas engine, particularly for use in traction apparatus as a prime mover; and more specifically, to control apparatus for the same.

A hot-gas engine is to be understood to mean a thermodynamic prime mover wherein a thermodynamic cycle is traversed by an amount of gas enclosed in a chamber of variable volume in which or in communication with which is a heating portion or, possibly a regenerator, and a cooling portion. This cooling portion is, in addition, in or in communication with a second chamber of variable volume. The chamber adjoining the heating portion and the chamber adjoining the cooling portion are called "hot chamber" and "cold chamber" respectively.

A portion of this amount of gas enclosed in the said chambers may, if necessary, be admitted into one or a pluraity of separate closed tubes or vessels and afterwards re-admitted from one or a plurality of these tubes or vessels into the said chambers. In all such cases the thermodynamic cycle is known as a "closed cycle." In the traction apparatus according to the present invention a hot-gas engine with closed cycle is used.

A traction engine or apparatus is to be understood to mean an engine intended to move forward, by means of mechanical traction, either itself, or other vehicles, vessels or loads, for which movement hydrodynamical or aerodynamical traction is impossible. In this case it is possible that the engine itself or, in conjunction with other vehicles, vessels or loads, move forward on the road or along a path specially intended therefor. Examples of such engines are motorcars, motorcycles, tractors, locomotives, motortrains, lifts, pile drivers, mountain trains and suspended railways. The invention is also applicable to hoisting-cranes, roadrollers, digging machines, winches and agricultural tractors, in which cases the path of the vehicle or of its load is less determined than in the first-mentioned cases.

It is already common practice to utilise a hot-gas engine as a traction engine, since such motors have a speed, direction of rotation and torque on the crank-shaft that can be easily varied. Therefore the use of a driving change gear between the engine and the drive shaft may be unnecessary since a hot-gas engine, in contradistinction to combustion motors with spark ignition or motors of the diesel type, has no definite minimum speed below which the operation of the engine stops, due to one or more conditions for the continuance of the thermodynamic cycle not being fulfilled. The torque developed on the crank-shaft of the hot-gas engine may be raised independently of its speeds by increasing the pressure of the gas in the cylinder-chamber in which the cyclic process takes place. For varying the direction of rotation of the hot-gas engine it is only necessary to reverse the phase between the variations in the volumes of the hot and the cold chamber. Valves or slides whose movement must be varied are not present.

In the known traction engines comprising a hot-gas engine as the engine motor, torque or the speed of the crankshaft has been adapted to the conditions which the traction engine has to satisfy, without paying attention to the efficiency of the maximum power that can be developed by the hot-gas engine. Every hot-gas engine has a given maximum power, usually termed full-load. To this end the various structural parts of the motor are designed, and to which named condition the supply of heat to the heater of the engine is adjusted also.

A primary feature of this invention is the provision of novel control means in a hot-gas engine so as to make it highly efficient when used with traction apparatus.

A principal object of this invention is to provide traction apparatus with a flexibly controllable and very efficient hot-gas engine under all load demands of said apparatus.

Another important object of this invention is to provide control means in a hot-gas engine used as the prime mover for traction apparatus wherein the delivered torque and traction speed is held substantially constant.

Another object of this invention is to provide means for controlling the primary heat input to a hot-gas engine in response to load demand changes of the same.

Other objects, features and advantages of the present invention will become apparent as the description proceeds hereinafter.

In the drawing:

Fig. 1 is a graphical representation of the relationship between torque and speed of the crankshaft of a hot-gas engine used for traction purposes.

Fig. 2 is a vertical longitudinal sectional view of a hot-gas engine mounted on a traction apparatus which is partially shown in one embodiment of the present invention.

Fig. 3 is a vertical sectional view of Fig. 2 taken along the lines 3—3; and

Fig. 4 is a detailed view of the control mechanism for effecting power output changes in a traction engine in response to both speed changes and load demand changes of said engine.

According to the present invention, the hot-gas engine for traction purposes comprises means whereby the product of the speed of the crank-shaft and the torque on the crank-shaft can be maintained substantially constant.

It is thus achieved that the power which is delivered to the crank-shaft remains substantially constant, regardless of the instantaneous speed of the traction engine. The capacity of the source of heat may be adapted to this power, so that this source of heat is in practice always subjected to a full load condition. At low speeds the torque is great, which implies that such a traction engine starts rapidly and can be easily operated. This also implies, however, that at low speeds the gas pressure in the motorcylinder will have to be high for the purpose of obtaining the required high torque. For reasons of construction only a definite maximum gas pressure is permissible in the motorcylinder, so that the said means for maintaining constancy of the product of torque and speed according to the present invention will have to limit their effect to a given maximum torque and a corresponding minimum speed. For lower speeds the full power is then not delivered but in most cases the speed can be reduced without objection and to such an extent that the ordinary working speeds are higher. When in particular cases very high degrees of torque are associated with the ordinary operation of the traction engine, as may be the case, for example, with agricultural tractors, driving change-gear having one speed stage may be provided between the hot-gas motor and the traction shaft. When using the hot-gas motor as a traction engine, it is in particular cases possible to increase the maximum torque. This necessitates raising the gas pressure in the cylinder at the same time the temperature of the heated parts of the cylinder is reduced. With a decrease in the temperature thereof, the mechanical strength of these parts then increases, so that a higher pressure of the gas in the cylinder is permissible without danger of heat-cracking of the parts, although at the cost of lower thermal efficiency of the motor.

Maintaining constancy of the product of speed and torque on the crank-shaft will in many cases be effected by adapting the torque to the speed of the hot-gas engine fixed by the traction engine. The torque on the crank-shaft may be changed by varying the average gas pressure in the motorcylinder or in the motorcylinders. This gas pressure may be varied in different ways, for example by varying the amount of gas medium taking part in the thermodynamic cycle.

In addition to the above-mentioned control for maintaining constancy of the output of the engine, in many cases, for example in the case of vehicles, a device for manual control of the power of the engine will be desirable. This control must not disturb, however, the above-mentioned automatic control for maintaining constancy of the output of the engine, that is to say, when a smaller power of the motor is adjusted by the manual control, the automatically operating control device must maintain this adjusted power even at different speeds of the vehicle.

In order that the invention may be more clearly understood and readily carried into effect, it will be described more fully by reference to the accompanying drawing.

Figure 1 shows graphically the relation between the speed and the torque M on the crank-shaft of a hot-gas engine for traction purposes. The speed $n$ is plotted as the abscissa and the turning moment M as the ordinate of a system of axes. Where the product of these magnitudes is maintained substantially constant, the relation between M and $n$ is fixed by a hyperbola. The torque M can, however, rise only to a given maximum value 10, as the strength factor of the material of the different parts of the engine does not allow of outputs greater than those resulting from this maximum torque.

Consequently, a constant torque of maximum permissible value is present from the position of rest to a definite low speed 11, without the engine giving the full-load output for which among other things the heat-source of the engine is proportioned. This speed 11 may, however, be so low that the portion 10—11 of this curve need be traversed only when the traction engine is started. The speed 11 lies below the minimum speed which is usual for this traction engine with ordinary operation.

When the speed of the traction engine increases, the torque and speed vary in accordance with the hyperbolic curve 11—12. Supposing that the resistance to traction extends in accordance with line 14, the traction engine would undergo an acceleration, as long as the torque on the crank-shaft according to curve 11—12 is still greater than the turning moment demanded by the resistance to traction, that is to say as long as curve 11—12 lies above the curve 14. At point 13 these two curves cut each other. At this speed of the crank-shaft the traction engine acquires a constant speed, at least as long as the resistance to traction remains unchanged. If the latter increases, for example on driving up a hill, the point 13 shifts along curve 11—12 until at a lower speed $n$ the torque demanded and delivered is equal again. The constant available product of torque and speed is adapted to the instantaneous resistance to traction without it being necessary for the motor power to undergo any change.

Figure 2 shows a longitudinal section of a hot-gas engine incorporated in a traction apparatus. The three motor cylinders 20, 21 and 22 are placed on a common crank-shaft 27 which is hermetically sealed with respect to these cylinders and to the surroundings. Three cranks 24, 25 and 26 are arranged at an angle of 120° on the common crank-shaft 27. Each crank is coupled to a piston moving in one of the three cylinders. In these cylinders the hot chamber of the cycle is located above the piston and the cold chamber of the same cycle is located in the chamber under the piston of another cylinder. The pistons in these two cylinders move with a difference in phase of 120°. Dividing a cycle over two cylinders permits of obtaining the required phase difference between the variations in volume of the hot and the cold chamber. Each end of the crank-shaft 27 is hermetically led through the wall of the crank-case 23. At the front of the vehicle the crank-shaft is fitted with a set of cams 28, which can be engaged by a claw 29 which is coupled to a starting handle 30. By pushing the starting handle 30 in known manner to the interior, the claw 29 engages the cams 28 on the crank-shaft 27, so that the latter may be set into motion with the aid of the handle. All the thermodynamic cycles are traversed once by a single rotation, so that after the burners 31 located above the different motor cylinders have been switched in, the hot-gas engine is started. In contradistinction to the starting of an explosion motor, this rotation of the crankshaft need not be effected with a definite minimum speed, since the speed at which the thermodynamic cycle of a hot-gas engine is traversed is not important. A protection against reaction of the crank-shaft is here neither necessary, since in contradistinction to an explosion motor a hot-gas motor shows no tendency to reaction.

On the chassis girders 32 of the vehicle are arranged, in addition to the driving engine, a radiator 33 through which the cooling water for the evacuation of heat from the hot-gas engine is circulating. If desired, an air-cooling system instead of a cooling system with water may be used. Furthermore, the usual coupling 34 for connecting the crank-shaft 27 with the traction-shaft 35 is arranged between the same chassis girders. This coupling, which may be realised as a friction clutch, is operated from the seat of the driver by means of a lever 36. The motor space contains, in addition, a fuel vessel 37, which communicates, by means of a line 38, with the various burners 31 placed above the motor-cylinders. This fuel line 38 includes a regulating valve 39, which can also be operated by hand from the seat of the driver by means of a lever 40. The latter is also coupled to a regulating rod 41 by means of which in each cylinder a device for the control of the indicated power of the motor may be adjusted. This device will be described in detail with reference to Figure 3. With the aid of the lever 40 the power of the engine can thus be adjusted by the driver of the vehicle, during which adjustment the power developed by the burner 31 is also adapted to the power of the motor. Such a manual control is in most cases necessary, in order to be able to limit the speed of the vehicle and to stop the motor.

The Figures 3 and 4 show a device for maintaining the product of the speed and the torque of the crank-shaft 27 substantially constant. The torque on the crank-shaft is dependent on the average pressure on the piston. This average pressure may be varied in different manners but the simplest manner is to vary the amount of gas that participates in the cyclic process. This variation may be brought about by admitting gas from a separate vessel into the cylinder, or by allowing gas to flow from the cylinder to a separate chamber. When this is invariably effected in a definite position of the piston the pressure of the gas available in that separate vessel will have to be high if the average pressure must be increased, and low if the average pressure must be decreased, in other words a plurality of separate vessels will have to be present. If, however, the communication between the chamber in which the cyclic process takes place and a separate vessel can be established at a moment which can be varied relatively to this cyclic process, a single vessel is sufficient in which a pressure prevails, comprised between the highest and the lowest gas pressure occurring in the cycle. If the moment at which the communication is established is displaced to a point of the cycle where the gas pressure prevailing is low, a gas current will flow from the auxiliary vessel to the cylinder. If, however, this moment is displaced to one at which high pressure prevails in the cycle, a gas current will flow away out of the cylinder.

A device for carrying out the control above described is shown in Figure 3. On an auxiliary shaft 45, which in the crank-case 23 is parallel to the crank shaft 27, there are placed as many excentrics 46 as there are cylinders with associated pistons and cranks. Each eccentric occupies a definite position relatively to the associated crank, so that the three eccentrics are also placed at 120°. With the aid of an excentric rod 47, each excentric 46 drives a small piston valve 48, which can move to and fro in a tube 50, which is specially intended therefor and which is in free communication with the crank-case 23. In the uppermost position of only each of the pistons 48, a communication line 49 between the motor cylinder and each of the tubes 50 is freed, so that during each revolution of the shaft a communication of short duration is established between each of the cylinders and the crank-case. This moment can, however, be displaced with respect to the movement of the piston and hence also with respect to the cyclic process in the cylinder, because the phase between the crank-shaft 27 and the auxiliary shaft 45 is adjustable. The crank-case 23, hermetically sealed with respect to its surroundings, serves in this case as a separate vessel, so that the provision of an auxiliary vessel is unnecessary.

The above-described control device permits of controlling the power by rotation of the auxiliary shaft 45 relatively to the crank-shaft 27.

This displacement between the two shafts 27 and 45 is produced by means of the mechanism described with reference to Figure 4, as a function of the speed of revolution of the crank-shaft 27. The two shafts hold chain wheels 51 and 52 respectively, on which runs an endless chain 53. The length of this chain is greater than the double distance between the two chain wheels plus the sum of their half circumferences. The chain 53 is, however, kept stretched by guide rollers 54, which are jointly arranged on a fork-shaped lever 55, which can rotate about a point 56 in the crank-shaft 27. The rotation of this lever about point 56 results in the gear 52 being driven by the chain 53, thus varying the position of the shaft 45 relatively to the crank-shaft 27. This fork-shaped lever and the chain 53 stretched on it consequently permit of establishing the desired variations in phase between the shafts 27 and 45. The displacement of the shaft 45 is effected automatically as a function of the crank-shaft 27 movement by means of a regulator 57 which is driven by the crank-shaft 27 in a manner suitable for the purpose. This regulator works in a known manner with the aid of centrifugal force and adjusts in the case of varying speed the extremity position of the lever 55 which extends beyond the center of rotation 56. This control mechanism, together with the eccentric 46 previously referred to, may keep the product of the speed of the crank-shaft and the torque of the crank-shaft at a value substantially constant. Small deviations from this constant value, as far as necessary or desirable in connection with the operation of the described mechanical control device, are permissible.

As the torque of the crank-shaft in connection with the strength limit of the common material is bound to the given maximum value, the control device described must be realized in such manner that the average gas pressure in the motor cylinder cannot exceed the given value. This condition may be fulfilled, for example, by making the gas pressure in the crank-case equal to the lowest pressure in the cyclic process, the average pressure of the cycle does not exceed the fixed value.

In addition to the above-described automatic control which has for its purpose to maintain constancy of the power of the engine at different speeds, a manual control also is required in order to be able to limit the power of the engine, if necessary, and thus to adjust a maximum speed of the vehicle. The latter control of power must directly act upon the indicated power of the engine without disturbing the function of the automatic control device. Figure 3 shows a device for controlling the power, which is constituted by a grid 58, included in the cycle of the gas medium. By displacing this grid in such manner that an aperture allowing the passage of the gas within the engine becomes wider or narrower, a resistance of variable value may be interposed in the path followed by the gas. The indicated power of the engine decreases with increasing resistance. Such a grid 58 is arranged in each cylinder between the cooler and the cold chamber. The operation of the grid is effected by a shaft 59 disposed through the wall of the engine. The three projecting shafts 59 are coupled to the common control rod 41 which has been described already with reference to Figure 2. This control is combined with the control of the supply of fuel to the burners for the heaters, so that the supply of heat is adapted to the indicated power.

What we claim is:

1. A hot-gas engine for use with traction apparatus comprising cylinder means, piston means therein, pressurized crank chamber means, crankshaft means, means connecting said piston means to said crankshaft means, and means including a chain driven auxiliary shaft responsive to speed changes of said apparatus cyclically connecting said pressurized means with said cylinder means.

2. A traction engine of the hot-gas engine type comprising cylinder means, gas chamber means, communication means between said respective means, crankshaft means, piston valve means for said communication means, and control means including a forked-shaped lever pivoted on said crankshaft means and containing an endless chain drive, said control means being responsive to engine speed changes for actuating said piston valve means periodically for opening said communication means for a short time at variable points of the engine cycles.

3. A traction engine comprising cylinder means, piston means therein, sealed crank chamber means, crankshaft means therein, means coupling said crankshaft means to said piston means, communication means interposed between said cylinder means and said chamber means, closing means for said communication means, and automatic means including a regulator and a forked-shaped lever coupled thereto holding a roller retained endless chain drive pivoted on said crankshaft means, said automatic means being used for changing the phase angle between said closing means and said piston means during engine load changes.

4. A hot-gas engine for traction purposes as claimed in claim 1 wherein means are provided to alter the primary heat input to said engine and movable means including a movable grid in each cylinder means in the respective paths of the thermal circulating medium are coupled to said latter means whereby the indicated power of said engine may be additionally adjusted promptly.

5. In a hot-gas engine having cylinder means, piston means therein and crankshaft means, a power control mechanism comprising sealed chamber means, duct means connecting said cylinder means to said chamber means, valve means in said duct means, Y-shaped means pivoted substantially midway the bottom portion thereof about said crankshaft means, a centrifugal regulator coupled to the end of said bottom portion responsive to engine speed changes, an auxiliary shaft, means including an eccentric coupling for said auxiliary shaft to said valve means for reciprocating said valve means upon rotation of said auxiliary shaft, chain wheel means, one being coupled to said crankshaft means adjacent said Y-shaped means, another being coupled to said auxiliary shaft between the upper branches of said Y-shaped member, guide roller means pivotally supported on said branches, and endless chain means contacting said wheel means and roller means, whereby said auxiliary shaft is turned and said valve means intermittently opens and closes said duct means.

HERRE RINIA.
HEINRICH de BREY.
FRANCISCUS LAMBERTUS van WEENEN.

REFERENCES CITED

The following references are of record in the file of this patent:

UNITED STATES PATENTS

| Number | Name | Date |
| --- | --- | --- |
| 336,093 | Daelen | Feb. 16, 1886 |
| 579,654 | Roediger | Mar. 30, 1897 |